United States Patent
Hundal et al.

(10) Patent No.: US 7,454,001 B2
(45) Date of Patent: Nov. 18, 2008

(54) METHOD AND APPARATUS FOR DETECTION OF CALLER IDENTIFICATION SIGNALING DURING CALL WAITING

(75) Inventors: Sukhdeep Hundal, Richmond (CA); Gary Rogaiski, Richmond (CA); Kant Wong, Tai Po (HK)

(73) Assignee: VTECH Telecommunications, Ltd., Hong Kong (HK)

( * ) Notice: Subject to any disclaimer, the term of this patent is extended or adjusted under 35 U.S.C. 154(b) by 813 days.

(21) Appl. No.: 10/988,800

(22) Filed: Nov. 15, 2004

(65) Prior Publication Data

US 2005/0265530 A1  Dec. 1, 2005

Related U.S. Application Data

(60) Provisional application No. 60/574,541, filed on May 26, 2004.

(51) Int. Cl.
*H04M 1/56* (2006.01)
*H04M 15/06* (2006.01)
*H04M 3/00* (2006.01)

(52) U.S. Cl. .............. 379/142.08; 379/215.01; 379/373.02; 379/374.01; 379/374.03

(58) Field of Classification Search .......... 379/88.19, 379/88.2, 88.21, 93.17, 93.23, 142.01, 142.04, 379/142.06, 142.08, 142.14, 142.17, 245, 379/247, 373.01, 373.02, 373.04, 371.01, 379/371.02, 374.03, 375.01, 215.01
See application file for complete search history.

(56) References Cited

U.S. PATENT DOCUMENTS

| | | | | |
|---|---|---|---|---|
| 5,519,774 | A * | 5/1996 | Battista et al. | 379/386 |
| 5,764,901 | A * | 6/1998 | Skarbo et al. | 709/204 |
| 5,784,444 | A * | 7/1998 | Snyder et al. | 379/142.01 |
| 5,825,862 | A * | 10/1998 | Voit et al. | 379/142.16 |
| 6,192,116 | B1 * | 2/2001 | Mayak | 379/142.08 |
| 6,366,670 | B1 * | 4/2002 | Davis et al. | 379/387.01 |
| 6,978,154 | B1 * | 12/2005 | Ospalak et al. | 455/557 |
| 2003/0016800 | A1* | 1/2003 | Fukuda | 379/142.01 |
| 2004/0067751 | A1* | 4/2004 | Vandermeijden et al. | 455/414.1 |
| 2007/0127707 | A1* | 6/2007 | Koser et al. | 379/373.03 |

* cited by examiner

*Primary Examiner*—Binh K Tieu
(74) *Attorney, Agent, or Firm*—Greenberg Traurig, LLP

(57) ABSTRACT

A method and apparatus for providing caller ID information related to a third party, to a telephone user already engaged in a telephone call with a second party. A burst of FSK data is transmitted to the user during the conversation with the second party. The FSK data signal is detected and modified as it is received, such as through the addition of a melody, prior to being audibly conveyed to the telephone user. The resulting modified signal is aesthetically pleasing to the user, while indicating to the user that communications with the second party are temporarily interrupted.

18 Claims, 4 Drawing Sheets

METHOD AND APPARATUS FOR DETECTION OF CALLER IDENTIFICATION SIGNALING DURING CALL WAITING

This application claims priority of the filing date of U.S. Ser. No. 60/574,541 filed May 26, 2004.

BACKGROUND

The invention relates generally to telephone communications systems, and specifically, to detection of caller identification data when receiving a call from a third party while already engaged in a conversation with a second party.

It is well-known in the art to provide caller identification (CID) services for users of telephone communications systems such as public switched telephone networks. CID is conventionally implemented while a telephone set is on-hook by transmitting digital data indicative of a caller's identity when a call is received during the time period between rings. It is also known to provide CID when a party receives a call from a third party while off-hook, i.e., while already engaged in a call with a second party. Such a service is commonly known as caller identification during call waiting (CIDCW) or Type II CID.

Conventionally, and as dictated by Bellcore specifications, CIDCW is implemented by muting a user's telephone handset for a period of time, during which the CIDCW signaling occurs. One example of such a system is disclosed in U.S. Pat. No. 5,263,084, issued Nov. 16, 1993 to Chaput et al., the disclosure of which is incorporated herein by reference. The muting operation serves to shield the user from any exposure to the potentially harsh noise that results from transmission of digital data on a telephone line. The muting operation further serves to prevent the user's voice from corrupting the digital data during the transmission of the digital data from the telephone company central office to the user's customer premise equipment, as well as during the transmission of data, such as the acknowledgment (ACK) signal, issued from the subscriber unit to the telephone company central office during the initial CIDCW handshake.

While caller ID information is being received, the handset is muted and communications on the line are temporarily interrupted. However, muting of the handset provides no indication to the subscribers that communications are interrupted. One or more of the parties involved in the conversation may not be aware that communications have been interrupted, potentially resulting in misunderstandings between the parties.

Another caller identification system is described in U.S. Pat. No. 5,836,009, issued Nov. 10, 1998 to Diamond et al., the disclosure of which is incorporated herein by reference. Diamond et al. provides an alternative implementation which attenuates but does not mute the caller ID information signal. The call recipient hears the noise of the acknowledgment tone and the FSK modulated caller identification signaling, which provide an audible indication to the user that communications have been disrupted. In an attempt to reduce the extent to which the acknowledgment tone and FSK noise may be objectionable to the user, the Diamond et al. system includes an attenuator operating to reduce the volume of the signaling noise before that noise is emitted by the recipient's telephone handset speaker.

However, even with an attenuator in place, the user is still subjected to signaling noise, which may be perceived as harsh electronic beeps and noise. The fundamental nature of the noise may be objectionable to some users, regardless of its volume. Moreover, some users may misunderstand the nature of the noises, erroneously thinking that an equipment malfunction has occurred. Further, subscriber units which rely upon attenuation of the received caller ID signals may still rely upon a muting mechanism for the CIDCW acknowledge signal issued to the central office.

SUMMARY OF THE INVENTION

A method for providing to a first party already engaged in a conversation with a second party via a local switching office, caller identification information related to a third party wishing to converse with the first party, is provided. A caller ID information signal is received by a first party apparatus. The caller ID information signal represents the caller identification information related to the third party, and can be decoded, with the caller ID information being displayed to the first party. A modified caller ID information signal is generated by adding a supplemental audio information signal to at least a portion of the caller ID information signal. The modified caller ID information signal is then provided to a receive transducer, such as a speaker, associated with the first party apparatus.

The supplemental audio signal can be generated by activating one or more tone generators, which may be configured to generate a short melody. The tone generators can optionally be triggered in response to detection of a portion of the caller ID information signal. The portion of the caller ID signal that triggers the tone generators can be an FSK mark signal, or a caller alerting signal (CAS). The tone triggers may also be triggered by the generation of a caller ID signal, such as the generation of an acknowledgment signal (ACK). The tone generators can be activated immediately upon detection of the selected activation event, or following a predetermined delay. The tone generator output can be applied to one or more inputs of an adder, the adder receiving the caller ID information signal at another input. The duration of the supplemental audio information signal can extend beyond the time at which the entirety of the caller ID information signal has been received. In such an embodiment, it may be desirable to decrease the amplitude of the supplemental audio information signal during the period of time after the end of the caller ID information signal.

A telephone apparatus capable of interconnection with a telephone network via a telephone line for receiving caller ID information associated with a call received from a third user while engaged in communications with a second user is also provided. The telephone apparatus includes a telephone line interface at which a caller ID information signal is received and an audio signal generator. The apparatus further includes an adder having inputs and an output. The inputs include one or more of the audio signal generator outputs, and the caller ID information signal. The audio signal generator may include a plurality of tone generators. The telephone apparatus may also include a caller ID information signal detector having an output indicative of the receipt of a caller ID information signal. The audio signal generator can be triggered by the output of the caller ID information signal detector, to produce audio signals at the one or more outputs. The duration of the signals provided at the audio signal generator outputs may extend beyond the period of time during which the caller ID information signal is received. The amplitude of the signals output by the audio signal generator may decrease after the period of time during which the caller ID information signal is received, such as may be desirable to provide a gradual termination for a melody output by the audio signal generator that is pleasing to the user of the apparatus.

The telephone apparatus may further include a transmit transducer having at least one output, a signal limiter having at least one input including an output of the transmit transducer. The signal limiter also has at least one output. A second audio tone generator having at least one output is provided. A second adder is provided, having a plurality of inputs and at least one output. The output of the second adder is coupled to the telephone line interface. The inputs to the second adder are at least one output of the signal limiter, and at least one output of the second audio tone generator. The second audio tone generator outputs a second caller ID acknowledgment signal, which may comprise a caller ID acknowledgment signal. The signal limiter attenuates the output of the transmit transducer such that the output of the transmit transducer will not interfere with the recognition of the caller ID acknowledgment signal output by the telephone apparatus by other equipment on the telephone network, such as a the telephone company's central office.

DETAILED DESCRIPTION OF THE DRAWINGS

Figure 1:
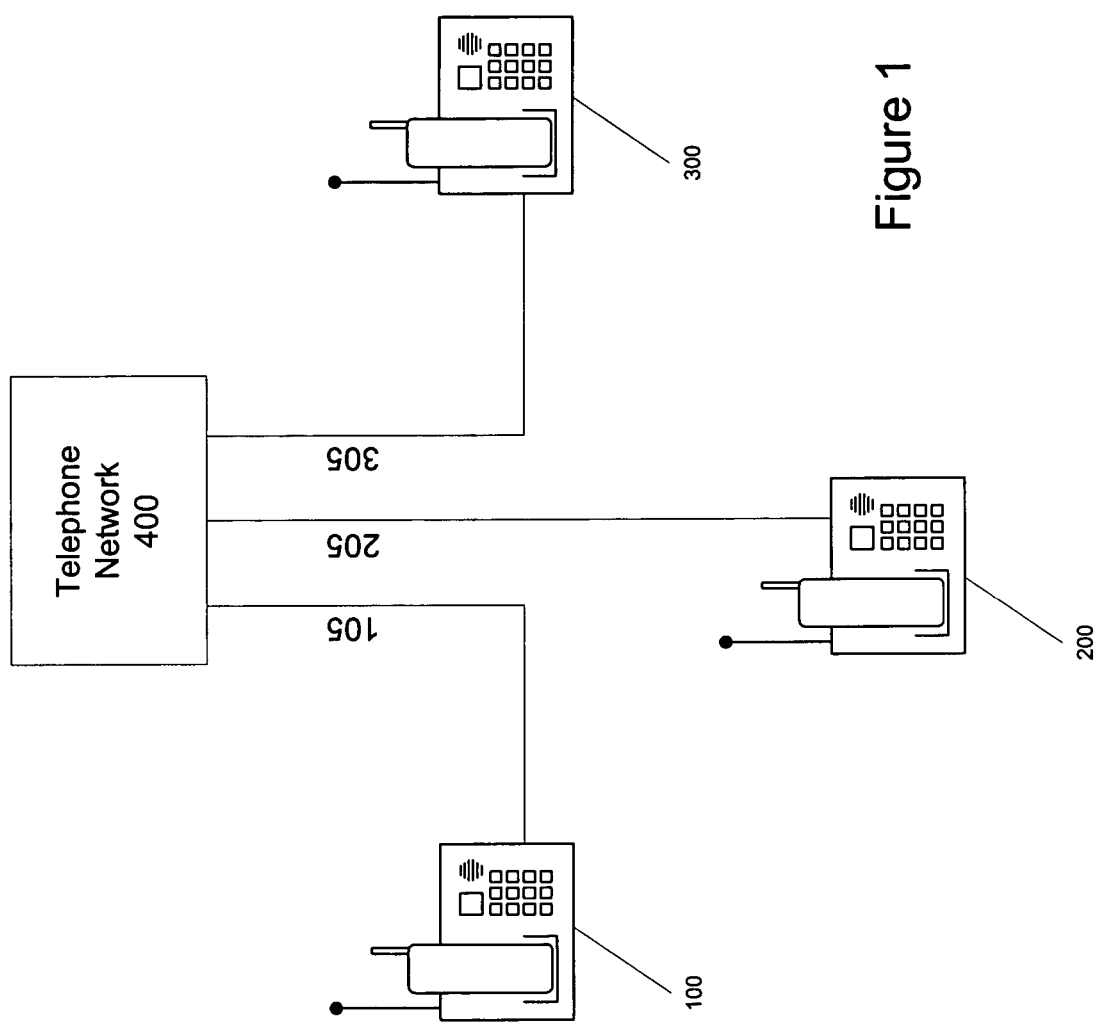
FIG. 1 is a block diagram of an embodiment of a telephone system in which CIDCW can be implemented utilizing the present invention.

While this invention is susceptible to embodiment in many different forms, there are shown in the drawings and will herein be described in detail, certain specific embodiments with the understanding that the present disclosure should be considered as an exemplification of the principles of the invention and is not intended to limit the invention to the embodiments so illustrated.

FIG. 1 illustrates an embodiment of a public telephone system in which CIDCW can be implemented in accordance with the present invention. Users of subscriber telephone stations 100, 200 and 300 can communicate with one another by placing telephone calls through public switched telephone network 400. Subscriber telephone 100 communicates with network 400 via telephone line 105. Similarly, subscriber telephones 200 and 300 each communicate with network 400 via telephone lines 205 and 305, respectively.

Subscriber telephone 100 is a digital cordless telephone, in which telephone line signals are converted to digital signals and processed digitally. Thus, numerous functions within the subscriber telephone are implemented via digital signal processing. As such, the signal paths can be readily reconfigured to implement varying functionality. However, it is understood that the present invention can be readily implemented using analog or other types of circuitry and signaling in lieu of the digital signal processing techniques employed in the illustrated embodiments.

Figure 2:
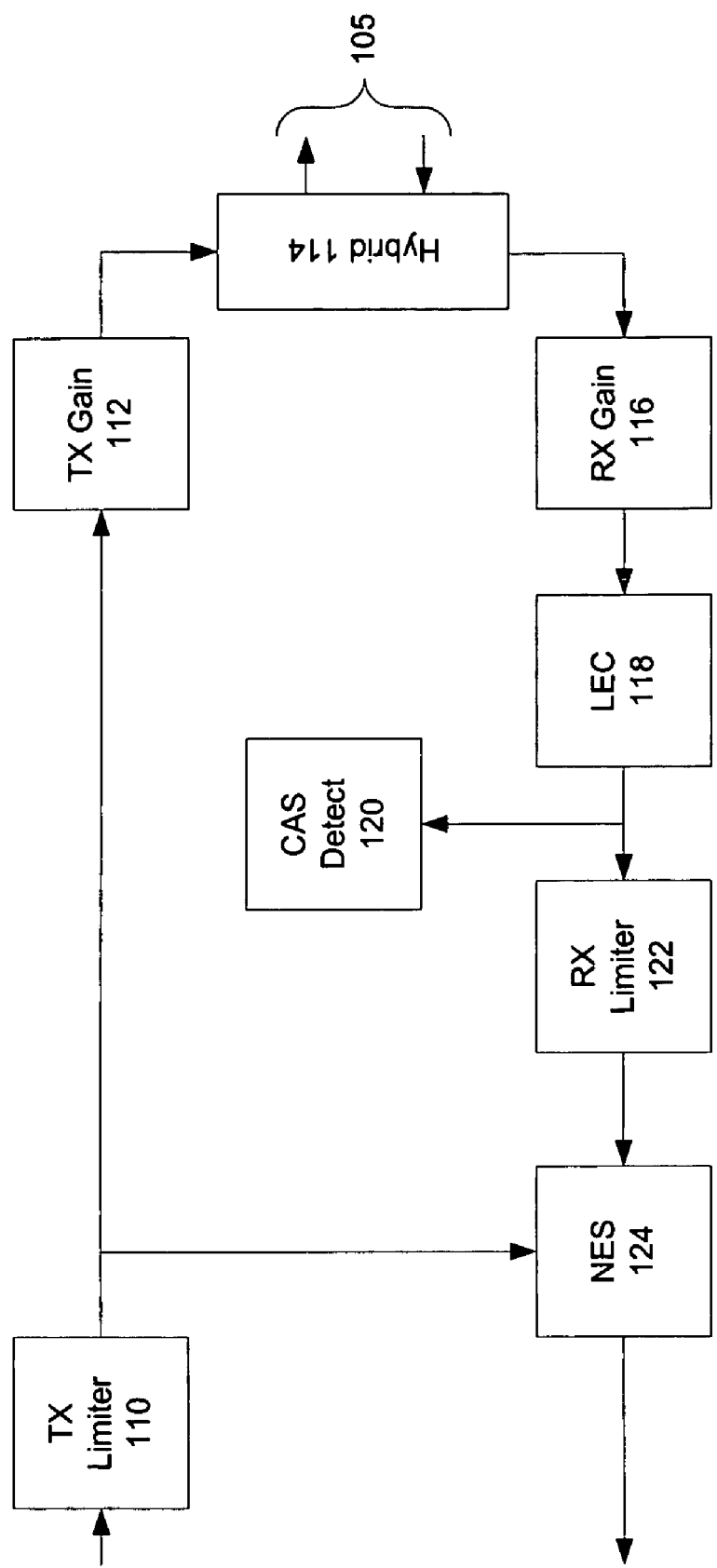
FIG. 2 is a block diagram of a telephone subscriber unit implementing detection of a caller alerting signal (CAS).

FIG. 2 is a block diagram of the receive and transmit signal paths within subscriber telephone 100 while telephone 100 is offhook and engaged in a telephone call with subscriber telephone 200 via public telephone network 400. Signals detected on the transmit transducer microphone (not shown) of the handset of subscriber telephone 100 are received by TX Limiter 110. TX Limiter 110 implements automatic gain control by attenuating the TX signal by an amount which varies between 12 and 34 dB in the illustrated embodiment, towards maintaining the signal level in the TX audio path near a predetermined level. Alternative upper and lower limits are contemplated and may be implemented to vary the user's perception of sound. Gain distribution may alternatively be performed in a manner which does not require TX Limiter 110. However, and as explained further below with reference to FIG. 3, TX Limiter serves a specific purpose when the ACK signal is issued during the CIDCW handshake. The output of TX Limiter 110 is applied to TX gain block 112, the output of which is applied to telephone line hybrid 114. Hybrid 114 operates to interface the audio system within telephone 100, having separate RX and TX audio paths, to the 2-wire telephone line, on which both sides of a conversation are combined. Hybrid 114 applies the TX audio signal to telephone line 105, for further conveyance to public switched telephone network 400 and subscriber telephone 200.

Incoming signals received from an inbound caller, such as from subscriber telephone 200 via public switched telephone network 400 on telephone line 105, are received at hybrid 114, separated, and conveyed to RX Gain block 116, which operates to buffer and control the signal level of the RX audio path. RX signals are then conveyed to Line Echo Canceller (LEC) 118. LEC 118 also receives input from the TX signaling path, specifically the output of TX Limiter 110. LEC 118 operates to cancel audible echoes, such as those potentially caused by telephone line conversion hybrids. The output of LEC 118 is applied to RX Limiter 122, which performs automatic gain control on the RX audio path towards maintaining the RX signal near a predetermined level and further conveys the RX signal to NES 124. NES 124 is a network echo canceller, which can optionally be provided to cancel signals reflected from the telephone network with longer time delays relative to the reference signal than those cancelled by LEC 118. The output of NES 124 is ultimately applied to a receive transducer comprising a speaker (not shown) within the handset of subscriber telephone 100 to provide audible output to the user. RX Limiter 122 should be considered an optional component and, in a preferred embodiment of the present invention, no RX limiter is interposed between the line echo canceller and the network echo canceller. Moreover, although LEC 118 and NES 124 are shown as separate functional blocks, or components, a common operational block may alternative perform both line echo and network echo cancellation.

The output of LEC 118 is also applied to Call Alerting Signal (CAS) detector 120. When a telephone call is placed from telephone 300 to telephone 100 while telephone 100 is connected to telephone 200, network 400 generates a CAS tone transmitted to telephone 100 provided that the user of telephone 100 subscribes to commonly-available call waiting service. CAS detector 120 within telephone 100 monitors the RX audio path and operates to detect predetermined audio signals corresponding to the CAS tone generated by public telephone network 400. When a CAS tone is detected, it is conveyed to the handset speaker of telephone 100, thereby alerting the user that another call is incoming. Telephone 100 then enters a mode of operation towards generating an acknowledgement signal (ACK). CAS tone detection begins as soon as telephone 100 goes off hook and ceases when it goes back on hook.

Figure 3:
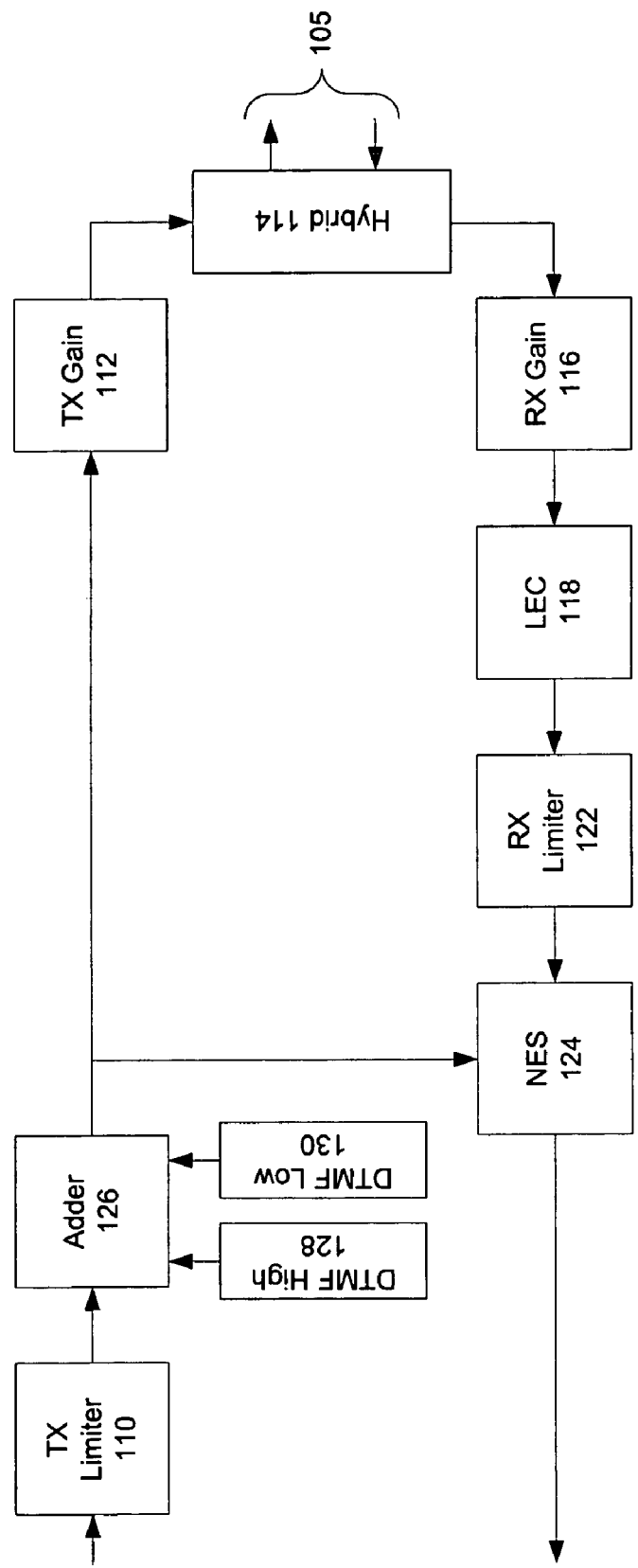
FIG. 3 is a block diagram of a telephone subscriber unit configured to transmit an acknowledgement signal (ACK).

FIG. 3 illustrates the configuration of telephone 100 after detecting a CAS tone. In response to detection of the CAS tone, telephone 100 does not mute or attenuate either of the Rx or Tx paths. Instead, as disclosed herein, a novel method and construction is employed to provide reliable CIDCW without muting or attenuation.

Initially, upon detection of the CAS tone, digital adder 126 is inserted into the TX audio path after the output of TX Limiter 110. Adder 126 serves to add tones generated by tone generators 128 and 130 to the signal on the TX audio path. TX limiter 110 serves to limit the level of the Tx speech received from the transmit transducer microphone to a predetermined maximum dB, such that when the Tx speech is mixed by Adder 126 with the tones of tone generators 128 and 130, the overall emitted signal (i.e., tones) to noise (i.e., including the Tx speech) ratio of the CIDCW signal issued to the Network 400 meets the specifications of the telephone company's equipment. Tone generators 128 and 130 operate to generate specific High and Low tones, respectively, corresponding to a standard DTMF (dual tone multi-frequency) signal that is recognized by Network 400 as an ACK signal. The DTMF ACK (DTMF tone D) is applied to telephone line 105 via TX Gain block 112 and hybrid 114, and is ultimately detected by Network 400. Upon detection of the ACK, Network 400 determines that subscriber telephone 100 is compatible with CIDCW service, i.e., telephone 100 is capable of receiving and decoding CID data corresponding to telephone 300, while engaged in communications with telephone 200. Network 400 will not generate or transmit a CID data signal to telephone 100 unless an ACK signal is first received.

Figure 4:
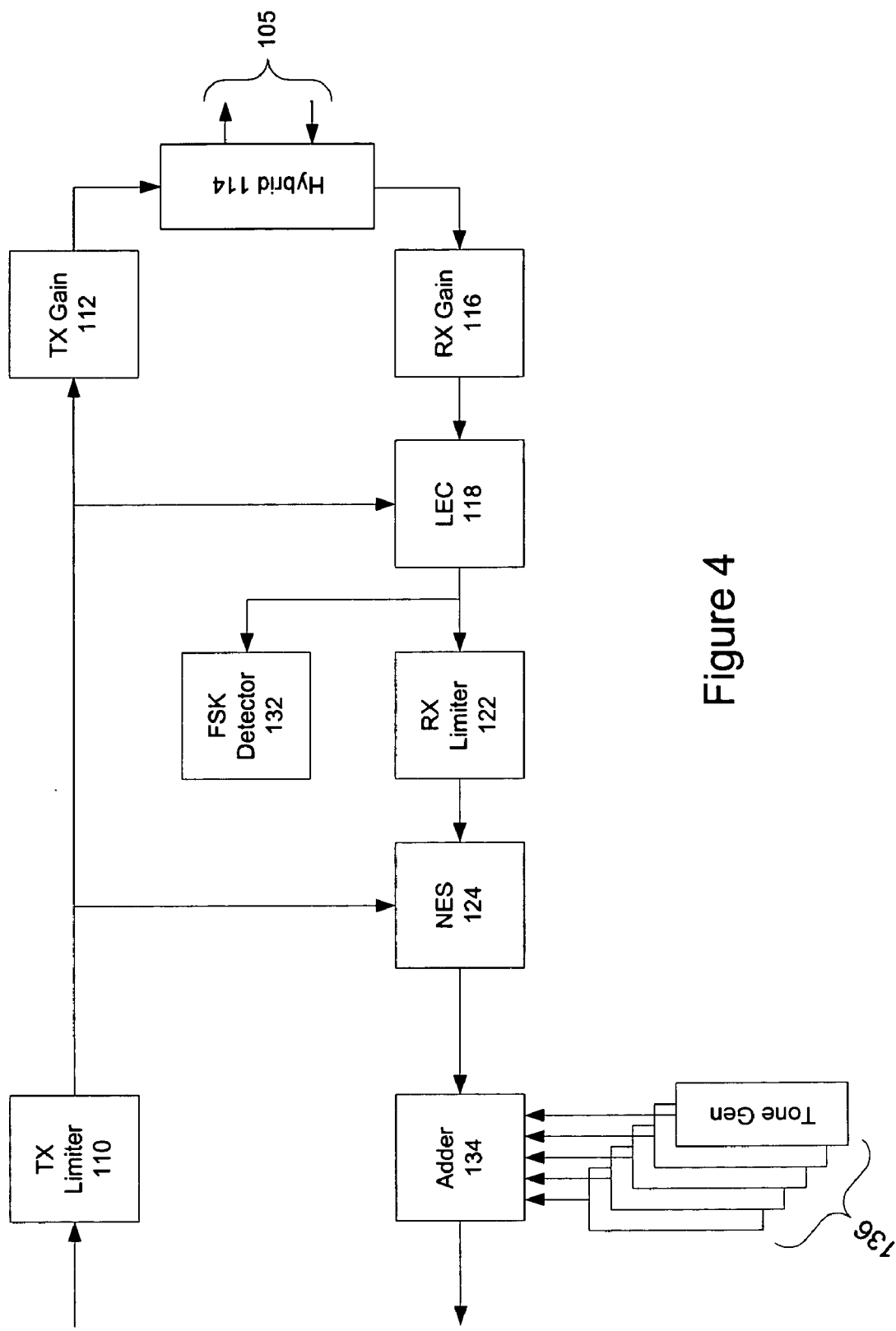
FIG. 4 is a block diagram of a telephone subscriber unit during receipt of CID data.

Once telephone 100 transmits the ACK, the audio signal paths of telephone 100 are configured in accordance with FIG. 4 so that telephone 100 is ready for FSK data detection. Telephone network 400 responds to detection of the ACK by transmitting a burst of digital data onto telephone line 105. The digital data burst is encoded using FSK (Frequency Shift Key) modulation that represents caller identification information corresponding to the identity of telephone 300 from which the incoming call is being received. Generally, when a FSK signal is received and reproduced as part of the audible signal by a telephone handset, the sound heard by the user is harsh and may be objectionable to a telephone user. Therefore, telephone 100 operates to mitigate the harshness of the FSK data burst without muting or attenuating the audio path.

Specifically, in the RX audio path of FIG. 4, the output of LEC 118 is applied to FSK detector 132. The output of NES 124 is applied to digital adder 134, which receives further inputs from tone generators 136. FSK detector 132 monitors the RX audio signal from the telephone line towards identifying the presence of a FSK data transmission on telephone line 105. For example, FSK detector 132 can identify a FSK Mark signal which indicates the beginning of a FSK data burst. Once the presence of a FSK signal is identified, FSK detector 132 receives and decodes the FSK data, towards processing the caller identification information contained in the data burst and conveying that information to the user of telephone 100.

When a FSK signal is detected by detector 132, tone generators 136 are activated to produce audible tones in a predetermined sequence which are fed to adder 134, thereby modifying the FSK signal in the RX audio path by mixing a melody with the FSX noise, thereby reducing the extent to which the presence of the FSK data in the RX audio path may be objectionable to the user of telephone 100, without muting or attenuating the RX audio path. Thus, rather than being subjected to a burst of raw noise when CID information is received from telephone network 400, the user of telephone 100 hears a modified audio signal perceived primarily as a pleasing melody. In the embodiment illustrated, eight tones are generated by tone generator 136, some in band and others out of band, which form a melody when combined and sequenced. The melody to FSK signal ratio in the illustrated embodiment is 18 dB. Tone generators 136 can be triggered by the detection of a Mark signal by FSK detector 132.

Although, in a preferred embodiment, the operation of tone generators 136 is triggered by the detection of a mark signal within the CIDCW data, other ways of activating the tone generators are also contemplated. For example, CAS detector 120 may instead be employed to trigger tone generators 136, either immediately or following a predetermined delay, following the detection of a Call Alerting Signal tone. Alternatively, tone generators 136 may be triggered, again either immediately or following a predetermined delay, in conjunction with the activation of tone generators 128 and 130 towards issuing the acknowledgment signal of the CIDCW handshake.

While eight tones are generated in the illustrated embodiment, a greater or lesser number of tones may be generated to provide a suitable melody. Moreover, while the embodiment of FIG. 4 illustrates processing of the FSK data burst through the addition of tone signals, it is understood that other types of signal processing can be performed on the FSK data burst within the scope of the present invention to alter the sound of the data burst as perceived by the telephone user. For example, a digitized audio clip could be stored within a digital memory, whereby the audio clip can be subsequently read out of the memory and added to a received FSK data burst signal.

In the illustrated embodiment, the melody will typically begin playing upon detection of the first byte of FSK data, or upon detection of the FSK Mark signal, and will stop 100 ms after the end of the FSK data. In one embodiment, the melody will ramp down −6 dB every 25 ms in the last 100 ms of play to provide a smooth, pleasing transition.

By implementing audio signal paths as described above, telephone 100 is capable of providing CIDCW functionality using signaling that is audibly more pleasing to the user than the unaltered caller ID signaling, without muting the telephone handset. Furthermore, unlike the silent muting period which occurs in certain prior art CIDCW systems, the modified audio signal produced by telephone 100 upon receipt of caller ID information is readily apparent to the user, thus providing unambiguous indication to the user that communications are temporarily interrupted.

The foregoing description and drawings merely explain and illustrate the invention, and the invention is not so limited, as those skilled in the art who have the disclosure before them will be able to make modifications and variations therein without departing from the scope of the invention.

What is claimed is:

1. A method of providing to a first party already engaged in a conversation with a second party via a local switching office, caller identification information related to a third party wishing to converse with said first party, comprising the steps of:
   receiving a caller ID information signal representing the caller identification information by a first party apparatus;
   generating a modified caller ID information signal by adding a supplemental audio information signal to at least a portion of the caller ID information signal;
   providing the modified caller ID information signal to a receive transducer associated with the first party apparatus.

2. The method of claim 1, in which the step of generating a modified caller ID information signal is comprised of the substeps of:
   generating the supplemental audio information signal by activating one or more tone generators;

applying the caller ID information signal to a first input of an adder having a plurality of inputs;

applying at least a portion of the supplemental audio information signal to one or more inputs of the adder other than the first input, while the caller ID information signal is being applied to the first input of the adder.

3. The method of claim 2, in which the step of generating a modified caller ID information signal is further comprised of the preceding substep of detecting an initial portion of a caller ID information signal; and in which the substep of generating the supplemental audio information signal is comprised of the substep of activating one or more tone generators in response to detection of a portion of a caller ID information signal.

4. The method of claim 3, in which the portion of a caller ID information signal is an FSK mark signal.

5. The method of claim 3, in which the portion of a caller ID information signal is a caller alerting signal.

6. The method of claim 2, in which the step of generating a modified caller ID information signal is further comprised of the preceding substep of generating a second caller ID information signal; and in which the substep of generating the supplemental audio information signal is comprised of the substep of activating one or more tone generators immediately upon the generation of the second caller ID information signal.

7. The method of claim 6, wherein the second caller ID information signal is an acknowledgment signal.

8. The method of claim 2, wherein in which the step of generating a modified caller ID information signal is further comprised of the preceding substep of generating a caller ID information signal; and in which the substep of generating the supplemental audio information signal is comprised of the substep of activating one or more tone generators after a predetermined delay following the generation of a caller ID information signal.

9. The method of claim 1, in which the supplemental audio information signal represents a melody.

10. The method of claim 1, in which the duration of the supplemental audio information signal extends a period of time beyond the time at which the entirety of the caller ID information signal has been received.

11. The method of claim 10, in which the amplitude of the supplemental audio information signal descends during the period of time beyond the time at which the entirety of the caller ID information signal has been received.

12. A telephone apparatus capable of interconnection with a telephone network via a telephone line for receiving caller ID information associated with a call received from a third user while engaged in communications with a second user, the telephone apparatus comprising:

a telephone line interface at which a caller ID information signal is received;

an audio signal generator having one or more outputs at which audio signals are provided;

an adder having a plurality of inputs and at least one output, the inputs comprising the outputs of the audio signal generator, and the caller ID information signal, the output of the adder being provided to a receive transducer of the telephone apparatus.

13. The telephone apparatus of claim 12, in which the audio signal generator is comprised of a plurality of tone generators.

14. The telephone apparatus of claim 12, the apparatus further comprising a caller ID information signal detector having an output indicative of the receipt of a caller ID information signal; and in which the audio signal generator is triggered by the output of the caller ID information signal detector to produce audio signals at the one or more audio signal generator outputs.

15. The telephone apparatus of claim 12, in which the duration of the signals provided at the audio signal generator outputs may extend beyond the period of time during which the caller ID information signal is received.

16. The telephone apparatus of claim 12, in which the amplitude of the audio signals at the audio signal generator outputs decreases after the period of time during which the caller ID information signal is received.

17. The telephone apparatus of claim 12, further comprising:

a transmit transducer having at least one output;

a signal limiter having at least one input comprising an output of the transmit transducer, and at least one output;

a second audio tone generator having at least one output; and a second adder having a plurality of inputs and at least one output coupled to the telephone line interface, the second adder inputs comprising at least one output of the signal limiter and at least one output of the second audio tone generator.

18. The telephone apparatus of claim 17, in which the output of the second audio tone generator comprises a caller ID acknowledgment signal, and the signal limiter attenuates the output of the transmit transducer such that the output of the transmit transducer will not interfere with recognition of the caller ID acknowledgment signal output by the telephone apparatus.

* * * * *

UNITED STATES PATENT AND TRADEMARK OFFICE
CERTIFICATE OF CORRECTION

PATENT NO. : 7,454,001 B2  Page 1 of 1
APPLICATION NO. : 10/988800
DATED : November 18, 2008
INVENTOR(S) : Sukhdeep Hundal, Gary Rogalski and Kent Wong It is certified that error appears in the above-identified patent and that said Letters Patent is hereby corrected as shown below:

On the Title page item (75) Inventors: the name Gary "Rogaiski" should be Gary --Rogalski--

On the Title page item (75) Inventors: the name "Kant" Wong should be --Kent-- Wong Signed and Sealed this Twenty-seventh Day of January, 2009

JOHN DOLL
*Acting Director of the United States Patent and Trademark Office*